United States Patent [19]

Lingl

[11] 4,070,985

[45] Jan. 31, 1978

[54] AUTOMATIC PRODUCTION APPARATUS FOR MANUFACTURING OF SPLIT TILE

[75] Inventor: Hans Lingl, Neu-Ulm, Ludwigsfeld, Germany

[73] Assignee: Lingl Corporation, Paris, Tenn.

[21] Appl. No.: 654,168

[22] Filed: Feb. 2, 1976

[30] Foreign Application Priority Data

Mar. 1, 1975 Germany ............................ 2508990

[51] Int. Cl.[2] ............................................. B65G 37/00

[52] U.S. Cl. ........................................ 118/6; 118/324; 198/420; 198/426; 214/6 A

[58] Field of Search ................... 118/6, 315, 316, 239, 118/324; 214/6 A; 198/420, 426, 431, 433, 471; 294/63 R

[56] References Cited

U.S. PATENT DOCUMENTS

| | | | |
|---|---|---|---|
| 1,864,806 | 6/1932 | Cumfer | 118/324 X |
| 3,270,897 | 9/1966 | Lingl | 214/6 A |
| 3,315,785 | 4/1967 | Shiffer | 198/420 X |
| 3,363,602 | 1/1968 | Platt et al. | 118/6 |
| 3,516,811 | 6/1970 | Gatchet et al. | 118/324 X |
| 3,603,466 | 9/1971 | Lingl, Jr. | 214/8.5 C |
| 3,625,375 | 12/1971 | Lingl | 214/6 A |
| 3,765,856 | 10/1973 | Bowman | 118/315 X |
| 3,951,283 | 4/1976 | Lingl, Jr. | 214/6 A |

FOREIGN PATENT DOCUMENTS

| | | | |
|---|---|---|---|
| 1,062,162 | 7/1959 | Germany | 214/6 A |
| 204,504 | 10/1923 | United Kingdom | 118/316 |
| 250,400 | 4/1926 | United Kingdom | 118/324 |

*Primary Examiner*—Mervin Stein

*Attorney, Agent, or Firm*—Cushman, Darby & Cushman

[57] ABSTRACT

An apparatus for the continuous and automatic manufacture of both glazed and unglazed split tiles by accepting automatically produced uncured newly cut and/or stamped split tile and thereafter automatically glazing and/or hacking same for kiln firing. A first conveyor system is provided where previously cut unglazed split tiles are placed on a conveying system in a spaced-apart fashion, and moved to a transfer position. Thereafter, a whole row of the unglazed spaced-apart split tiles are transferred to a grouping table where layers for a hack are formed by a plurality of adjacent transferred rows. Each layer is subsequently transferred to a kiln car and oriented 90° with respect to the just previously deposited layer so as to maintain the desired spaced relationship in the final hack. A second alternative conveying system is also provided in the preferred exemplary embodiment which moves unglazed split tiles individually through a glazing area where both sides are glazed. Thereafter, the glazed split tiles are dried and grouped in a spaced-apart fashion similar to the unglazed tiles. When a predetermined row length has been formed, such row is transferred to the same grouping table where hack layers are formed and incorporated within a hack in the same way that unglazed tile are handled.

8 Claims, 1 Drawing Figure

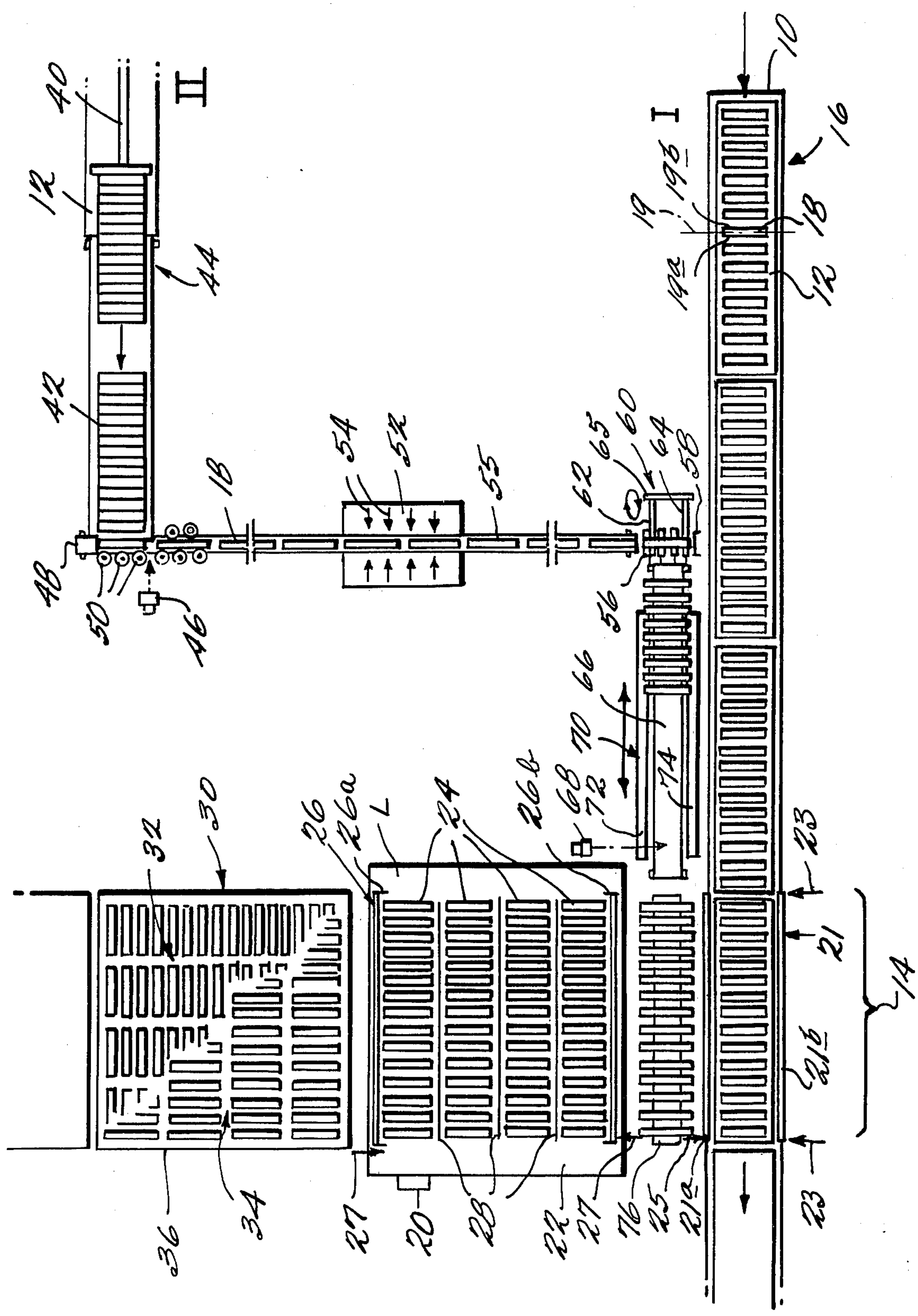

AUTOMATIC PRODUCTION APPARATUS FOR MANUFACTURING OF SPLIT TILE

This invention relates generally to an apparatus for further automating the manufacture of split tiles. Split tiles, per se, are described more fully in my co-pending United States patent application Ser. No. 478,036 filed June 10, 1974, now abandoned in favor of continuation application Ser. No. 639,346 filed Dec. 10, 1975, divisional application Serial No. 557,222 filed Mar. 10, 1975, now Pat. No. 3,976,417 which issued Aug. 4, 1976, and continuation-in-part application Ser. No. 524,998 filed Nov. 18, 1974. The disclosure of all these copending applications is hereby expressly incorporated by reference.

Briefly summarizing, split tile, per se, are formed by extruding a raw clay material in a hollow walled manner providing two relatively thin outer side walls on either side of the longitudinal extrusion axis. These side walls may each be stamped or pressed partially therethrough with a desired tile geometry (perhaps ornamental) and cut into appropriate lengths (before or after stamping) which are then hacked and fired. The final desired ceramic tile product is then provided after firing by splitting the hollow walled structure and by breaking out the previously stamped tile geometries.

The automatic extrusion, cutting and/or stamping of such split tile structures and the automatic spaced-apart placement of the cut lengths on pallets for drying purposes is already described in my aforesaid co-pending applications and/or is otherwise known in the art. However, the further production sequence of hacking and/or glazing and hacking such cut lengths of split tiles have heretofore required many time consuming individual processing steps.

The present invention fully automates the production sequences involved just after the cut lengths of split tiles have been spaced apart on drying pallets up to and including the automatic setting of kiln cars for firing. Split tile supplied on drying pallets with the required spacing for setting can be directly transferred from dryer car unloading equipment to the hack setting machine without special additional alignment.

This invention not only greatly simplifies such portion of the production sequence but also makes it possible to incorporate an alternate production line including a tile glazing machine and to then feed the glazed split tile lengths into the same automatic hack setting machine as is used for unglazed split tile.

This invention provides both higher production capacities and better quality control by improving the uniformity of the set hacks for firing and with better gas penetration through the hack because of the automatic evenly spaced rows of split tiles.

The present preferred exemplary embodiment employs two conveyor systems which preferably are each fed directly from split tile extruding, cutting, stamping and drying equipment. The first conveyor system is supplied with raw cut and stamped lengths of unglazed split tiles on a pallet in a row wherein the longitudinal tile faces are spaced-apart by the amount desired for firing purposes. Such rows are grouped into a layer which is thereafter used to form a hack for kiln firing.

The second conveyor system also accepts the spaced-apart split tile lengths from a drying pallet. However, in this instance, a push-off bar is used to close-up and unload the row of tiles onto a conveyor. Special transfer mechanism then transfers one tile at a time onto another conveyor (at right angles) where the split tiles pass single file through glazing and drying stations. The glazed tiles are subsequently transferred at right angles onto yet another conveyor to form a row of a predetermined length. By properly controlling the transfer mechanism and receiving conveyor belt movement, the tiles in each row of glazed tiles are also spaced apart from one another a specific desired amount. Thereafter, such rows of spaced apart tile are also grouped together into layers and automatically hacked by the same apparatus used for hacking the unglazed split tiles as previously described.

The present invention accomplishes, therefore, the continuous hacking of either glazed or unglazed split tiles. Switching between glazed and unglazed operation can be effected simply by feeding pallets into one or the other of the conveyor systems without in any way interrupting the operation of the manufacturing process.

A more complete and detailed understanding of this invention may be obtained by reading the following detailed description in combination with the accompanying drawing which represents a diagrammatic plan view of exemplary apparatus according to the present invention.

Turning to the drawing, the first conveying system is generally indicated by I, whereas, the second conveying system is generally indicated by II.

The first conveying system is comprised of a conveying belt 10 or any other conventional conveying mechanism which moves pallets 12 into a transfer area generally referenced at 14. Each pallet 12 supports a row 16 of a predetermined number of split tile lengths 18, with each of the split tiles 18 having been placed on the pallet 12 in a predetermined spaced apart condition as required. Each hollow split tile length has been extruded along a longitudinal axis 19 so as to form two relatively thin walls 19*a*, 19*b* which each constitute the desired tile shape and/or which have each been at least partially stamped through with the desired tile shape. The actual tile faces are thus outwardly directed along each longitudinal side wall 19*a*, 19*b* and extend in a plane transverse to the plane of the plan view drawing.

When a pallet 12 is positioned at the transfer position 14, as sensed by conventional, position sensing means 23, the conveyor 10 is stopped and a row 16 of split tiles 18 is picked up by a transfer gripper 21 and transferred to a grouping table 22. It should be noted that the transfer gripper 21 can comprise two horizontal blades 21*a* and 21*b* which can be operated by conventional means, not shown, so as to move together or close along arrows 25 and respectively engage the head ends of split tiles 18. In this manner, the tiles 18 forming a row 16 are transferred without altering the spacing between each tile.

Suitable transfer gripping apparatus (including electrical and/or hydraulic control and control logic therefor) is conventionally available from the brick making arts. For example, there are conventional gripping, lifting and transferring apparatus known, per se, in the brick making arts which simply clamp row(s) of already spaced bricks, lift same and transfer same to a desired other location without altering the interbrick spacing within a row.

As shown in the drawing, a layer L for the hack 30 has been formed on grouping table 22 by programming transfer device 20 to successively deposit rows into adjacent positions 24 as shown. The apparatus for achieving such desired programming, per se, is already known in the art. It should be understood, however, that a layer could equally as well be larger or smaller in terms of the number of rows of split tiles therein. When a layer has been formed on the grouping table 22, a setting gripper 26 (similar to gripper 21) which is provided with two external gripping members 26a and 26b and intermediate tongues 28 will be actuated by conventional means, not shown, so as to move together in the direction of arrows 27 and engage all of the groups or rows of split tiles forming the layer and to then transfer the gripped layer onto the hack 30.

The hack 30 is, in turn, comprised of a plurality of layers of split tiles such as is shown at 32 and 34 with each subsequent layer being turned 90° with respect to the preceding layer. Mechanism for achieving such 90° relative orientation of adjacent layers is also known in the brick making arts as a part of conventional gripper 26. These stacked layers are supported on a kiln car 36, which will subsequently be automatically transported into a firing oven or kiln.

Turning now to the second conveying system II shown in the drawing, it is sometimes desirable to glaze split tiles after drying especially when trying to achieve special effects, or when it is important to improve the chemical resistance of split tiles, such as when split tiles are being produced for use in food processing plants or in other areas where high chemical resistance is desirable.

As shown at the top of the drawing, the second conveying system II also receives split tiles 18 from pallets 12. Specifically, the row of split tiles on the pallet 12 is engaged by a push-off assembly 40 so that the split tiles 18 are closed-up and transferred from the pallet 12 onto a first conveyor belt 42, which serves to convey the tiles 18 toward a second conveyor 48 which is positioned perpendicularly with respect to conveyor 42. Each row of tiles will now be in a closed-up abutting relationship as indicated at 44.

The operation of conveyor 42 is preferably intermittent, and is controlled as, for example, by means of a photo-electric eye 46. The photo-electric eye 46 actuates movement of conveyor 42 so as to feed tiles 18 one at a time onto conveyor 48. The combined operation of conveyors 42 and 48 places individual tiles on conveyor 48 in single file with these individual split tiles being moved through a glazing machine 52 where each tile face is subjected to an application of glazing material.

The vertical rollers 50 are provided adjacent the area where split tiles 18 are deposited on conveyor 48 so as to prevent split tiles 18 from falling over or from falling off conveyor 48.

The photo-electric eye 46 as indicated above controls the operation of conveyor 42 and serves to stop the forward movement of conveyor 42 for as long as it takes for each transferred tile 18 to move out of the transfer area, thereby assuring placement of individual tiles on conveyor 48. It should be understood, however, that other conventional control devices such as trip arms, could be equally well used instead of the photo-electric eye 46.

Following the glazing operation, the now glazed split tiles 55 continue to be moved by conveyor 48 and the length of conveyor 48 which extends beyond the exit of the glazing machine 52 while not critical should be of a sufficient length to allow the glaze to dry. Each glazed tile 55 is finally deposited by conveyor 48 on a group of guide rollers 56 positioned at the end of conveyor 48. The guide rollers 56 direct each individual glazed tile 55 to a stop 58 and together serve to correctly position the glazed tiles for transfer by the transfer device indicated at 60.

The transfer device 60 which is movable by conventional means, not shown, between a normal and transfer position is provided with transfer arms 62 and 64 joined together by a common linkage arm 65. When the transfer device 60 is in its normal position, transfer arms 62 and 64 lie between the guide rollers 56. When the transfer device 60 is actuated, transfer arms 62 and 64 are raised so as to engage the bottom of glazed tiles 55 and lift individual split tiles 55 toward and deposit them upon a third conveyor 66 which also operates in a direction perpendicular to the direction in which conveyor 48 operates. Movement of the transfer device 60 is in a sleeve-like or oval pattern and is operated in a predetermined time relationship with the operation of conveyor 66 so that the glazed tiles 55 are deposited on conveyor 66 in a spaced apart and controlled manner. For example, the conveyor 66 may be programmed to move forward by a predetermined increment (allowing for desired spacing) in response to actuation of a switch by stop 58. Other techniques and apparatus for forming a row of spaced-apart articles may also be used, for example, shown in my prior U.S. Pat. No. 3,625,375 issued Dec. 7, 1971. In this way rows of glazed tiles 55 are formed on conveyor 66 so that each row of glazed tiles can be identical in size and inter unit spacing with the row 16 of unglazed tiles on pallets 12 in the first conveying system.

In order to control the row length, the depositing of glazed tiles 55 on conveyor 66 will continue until the first tile in that group or row breaks the light beam of a second photo-electric eye 68, or actuates any other suitable type of sensing device which will, in turn, actuate a transfer device generally indicated at 70.

The transfer device 70 is comprised, for example, of two gripping arms 72 and 74 which are movable by conventional means (not shown) between normal and gripping positions. When the transfer device 70 is actuated by photo-electric eye 68, gripping arms 72 and 74 will be brought into engagement with the head ends of the glazed split tiles 55, and the transfer device 70 will be moved by any convenient means (not shown) from its normal position, as shown, to its transfer position over a support member 76. Following this transfer, the row of glazed tiles 55 is released by arms 72 and 74 and are supported by support 76 and the transfer device 70 is returned to its normal position so as to be ready for the next transfer.

With the row of glazed tiles 55 having been deposited on support member 76, the transfer gripping device 21, previously used to transfer a group 16 of split tiles 18 from the first conveyor system onto the grouping table 22, is programmed to move the row of glazed tiles 55 from the support member 76 onto the grouping table 22. As was previously described, when a complete layer is formed on a grouping table 22, that layer will be transferred to the kiln car 36 by gripper 26 so as to form successive layers in a hack 30.

Thus, the first and second conveying systems allow for the continuous automatic formation of hacks comprised of either and/or both glazed and unglazed split tile lengths together with a continuous automatic operation for glazing split tiles.

It will now be clear that this invention provides a device and method which accomplishes the objectives heretofore set forth. While the invention has been disclosed in a presently preferred exemplary form, it should be understood that this specific embodiment modified in many specifics without materially departing from the novel teachings of the present invention which should be construed according to the scope of the following appended claims.

What is claimed is:

1. Apparatus for forming rows of glazed and unglazed split tile lengths into hacks for kiln firing comprising:

first and second conveying systems, said first conveying system comprising first conveyor means for moving pallets supporting a row of spaced-apart unglazed split tile lengths to a first transfer position, grouping area means for accumulating a predetermined number of adjacent rows of split tile lengths as a layer, row transfer means for moving the row of spacedapart split tile lengths from the pallets located at said first transfer position to said grouping area means while maintaining the spacing established between the individual split tile lengths, layer transfer means for moving layers from said grouping area means to a kiln car, said second conveying system comprising first, second and third conveyor means, feeding means for feeding a palletized row of split tile lengths to said first conveyor means, said second conveyor means being disposed perpendicularly to said first conveyor means and being adapted to individually receive split tile lengths therefrom in single file formation, glazing means disposed on at least one side of said second conveyor means for glazing the split tile lengths passing therealong, said third conveyor means being disposed perpendicularly to said second conveyor means and adapted to receive split tile lengths therefrom one at a time so as to form a row of spaced-apart split tile lengths on the third conveyor means, and means for transferring thus formed rows to a second transfer position, said row transfer means also being adapted to move a row of spaced-apart split tile lengths located at said second transfer position to said grouping area means while maintaining the spacing established between the individual split tile lengths.

2. Apparatus as in claim 1 wherein said layer transfer means is adapted to rotate alternate ones of said layers through at least 90° prior to the depositing thereof in a hack on a kiln car.

3. Apparatus as in claim 1 wherein said feeding means comprises a push-off mechanism which reciprocates along the length of a palletized row of split tile lengths so as to close-up same and push them off onto said first conveyor means.

4. Apparatus as in claim 1 further comprising control means controlling the relative operations of the first and second conveyor means so as to produce said single file formation of split tile lengths on said second conveyor means.

5. Apparatus as in claim 4 wherein said control means comprises a position sensing means disposed to detect the presence of a split tile length on the second conveyor means in the discharge area from said first conveyor means and to stop operation of the first conveyor means in response thereto.

6. Apparatus as in claim 1 further comprising article transferring means disposed intermediate said second and third conveyor means and timed in operation with respect to operation of said third conveyor means so as to transfer individual split tile lengths thereto spaced apart by predetermined desired amounts.

7. Apparatus as in claim 6 wherein said article transferring means comprises means for lifting said individual split tile lengths, moving said lengths over the third conveyor means and then lowering said lengths thereunto.

8. Apparatus as in claim 1 including control means for detecting when a row of predetermined length has been formed on said third conveyor means and for initiating its transfer to said second transfer position in response thereto.

* * * * *